United States Patent [19]

Johnson et al.

[11] Patent Number: 4,503,887

[45] Date of Patent: Mar. 12, 1985

[54] PILOT-OPERATED DUAL FLOW RATE VALVE

[75] Inventors: Terence L. Johnson, Bridgewater; Lance Guthreau, East Hanover, both of N.J.

[73] Assignee: Automatic Switch Company, Florham Park, N.J.

[21] Appl. No.: 340,616

[22] Filed: Jan. 19, 1982

[51] Int. Cl.³ .......................................... F16K 31/145
[52] U.S. Cl. .............................. 137/624.13; 251/30; 137/599
[58] Field of Search ..................... 137/624.13, 624.15, 137/599; 251/30, 129; 361/194

[56] References Cited

U.S. PATENT DOCUMENTS

| | | | |
|---|---|---|---|
| 3,200,591 | 8/1965 | Ray | 361/194 X |
| 3,356,106 | 12/1967 | Riseman | 137/624.13 X |
| 3,378,732 | 4/1968 | Dietz | 361/194 |
| 3,439,895 | 4/1969 | Marandi | 251/30 |
| 3,538,944 | 11/1970 | Riordan | 251/45 |
| 4,295,631 | 10/1981 | Allen | 251/30 |

*Primary Examiner*—Alan Cohan
*Attorney, Agent, or Firm*—Alan H. Levine

[57] ABSTRACT

A valve including a pilot valve body having an inlet port, an outlet port, and an orifice between the ports surrounded by a valve seat. A valve member is movable into and out of engagement with the valve seat to close and open the valve, respectively. The valve member can be oscillated to permit a reduced rate of flow through the valve. The valve member may be carried by the armature of an electrical solenoid; when the solenoid is energized by full wave AC power, the valve is held open in a stable condition, and when the solenoid is energized by half wave AC power, the valve member oscillates. The valve is used as the pilot valve of a main valve, wherein when the valve member is oscillated to permit reduced rate flow through the pilot valve, the main valve remains closed.

6 Claims, 5 Drawing Figures

PILOT-OPERATED DUAL FLOW RATE VALVE

This invention relates to valves for controlling the flow of liquids, and more particularly to such a valve capable of providing two different rates of flow, as well as shutting off flow completely.

In certain installations, such as automatic liquid dispensing equipment, large but precise metered amounts of liquid must be delivered within a relatively short time. An example of such equipment is that used at self-service gasoline pumps. A customer will pre-pay for a particular amount of fuel, and then operate the pump which has been set to deliver the exact quantity paid for. Typically, two separate valves are used in this operation: a large orifice valve for rapidly delivering most of the gasoline, and a smaller orifice, or "topping off", valve for accurately completing delivery of the remaining portion. The large flow rate valve is closed during the final filling operation through the slower flow rate valve. If only a large orifice valve were used, it would be very difficult to deliver the exact quantity of liquid desired, and if only a small orifice valve were used, delivery would take too long.

While these two-valve arrangements operate satisfactorily, they are relatively expensive. Usually, the valves are solenoid operated. Thus, in addition to requiring two valves, two separate electrical solenoid operators must be furnished, as well as associated wiring for two solenoids and piping for two valves.

It is an object of the present invention to provide a single pilot-operated two-way valve which can automatically provide two different flow rates, and thus take the place of the conventional high and low flow rate pair of valves.

It is another object of the invention to provide a pilot-operated dual flow rate main valve component having two flow conditions, one in which the valve is in a stable open position, and the other in which the pilot valve member is oscillated to permit only restricted flow through the valve.

It is a further object of the invention to provide such a valve operated by a single solenoid, the solenoid being energized by half-wave rectified AC power to cause oscillation of the pilot valve member, and having full wave AC power applied to it to produce the stable open position of the valve.

It is an additional object of the invention to provide a dual flow rate, two-way, pilot-operated valve. When the pilot valve is fully opened, the main valve opens to provide a large flow rate. When the valve member of the pilot valve is oscillated, the main valve remains closed and flow takes place, at a low rate, only through the pilot valve.

Additional objects and features of the invention will be apparent from the following description, in which reference is made to the accompanying drawings.

Figure 1:
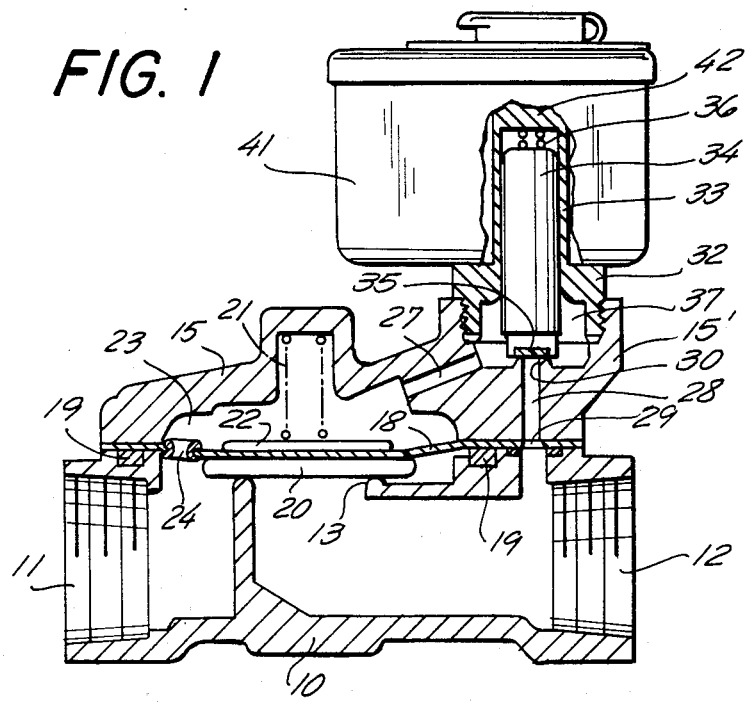
FIG. 1 is a cross-sectional view of a pilot-operated valve, according to the invention, in completely closed condition.

The valve chosen to illustrate the present invention includes a valve body 10 having a main inlet port 11, a main outlet port 12, and an orifice 13 between the ports surrounded by a circular valve seat 14. Mounted upon body 10 is a bonnet 15, the body and bonnet being secured together by bolts (not shown).

Sandwiched between body 10 and bonnet 15 is the margin of a flexible diaphragm 18, seals 19 also being present to insure a liquid-tight seal between the parts. Secured to the lower face of diaphragm 18 is a main valve member 20 movable into engagement with valve seat 14 (FIG. 1), to close the main valve, and out of engagement with the valve seat (FIG. 2), to open the main valve. A compression spring 21, arranged between bonnet 15 and a support plate 22 carried by the upper surface of diaphragm 18, continuously urges the diaphragm and main valve member 20 toward valve seat 14.

Bonnet 15 and diaphragm 18 define a chamber 23 between them. Chamber 23 is in constant communication with main inlet port 11 through a bleed hole 24 defined by a grommet passing through a hole in diaphragm 18.

Figure 2:
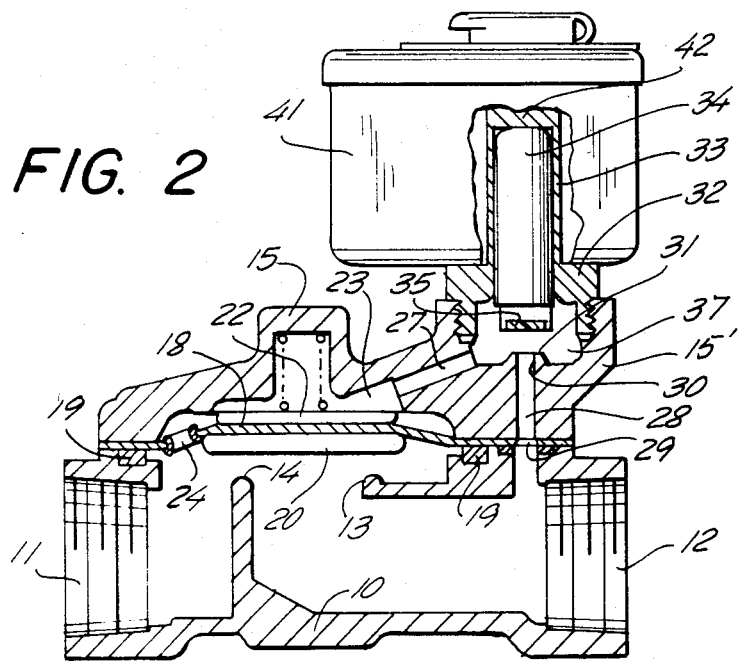
FIG. 2 is a cross-sectional view of the valve in fully opened condition.
Figure 3:
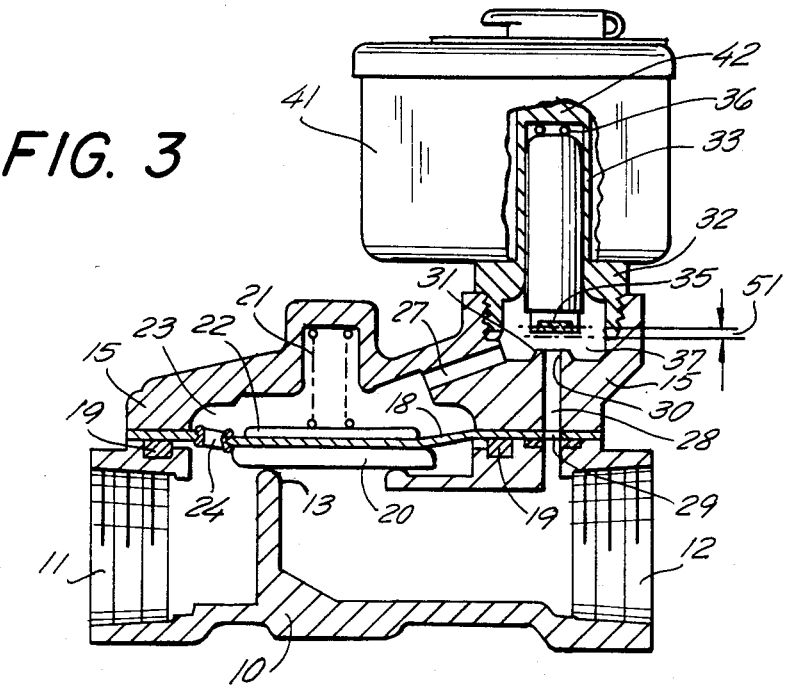
FIG. 3 is a cross-sectional view of the valve showing the main valve closed and the pilot valve in its vibratory open condition.

The right side of bonnet 15 (as seen in FIGS. 1-3) constitutes the body 15' of a pilot valve. Pilot valve body 15' includes a pilot inlet port 27, communicating with chamber 23, a pilot outlet port 28, communicating with main outlet port 12 through a hole 29 in diaphragm 18, and a pilot orifice 30, between the two pilot ports, surrounded by a circular pilot valve seat 31. Threaded into pilot valve body 15' is a bonnet 32 carrying a tube 33 within which an armature 34 is longitudinally slidable. At its lower end, armature 34 carries a resilient pilot valve member 35 movable into engagement with pilot valve seat 31 (FIG. 1), to close the pilot valve, and out of engagement with the valve seat 31 (FIG. 2), to open the pilot valve. A compression spring 36 continuously urges armature 34 and hence valve member 35 toward valve seat 31. Valve body 15' and bonnet 32 define a pilot valve chamber 37 between them, which constantly communicates with chamber 23 through pilot valve inlet port 27.

A solenoid coil (not shown in FIGS. 1-3, but indicated by the reference numeral 40 in FIGS. 4 and 5) surrounds tube 33 and is enclosed within a housing 41. When coil 40 is energized, armature 34 rises in tube 33, against the force of spring 36, and engages a stationary armature 42 located within the upper end of the tube (FIG. 2). In this condition, the pilot valve is fully open. Upon deenergization of the solenoid coil, spring 36 returns armature 34 to the position in which valve member 35 engages valve seat 31 (FIG. 1) so as to close the pilot valve.

Figure 4:
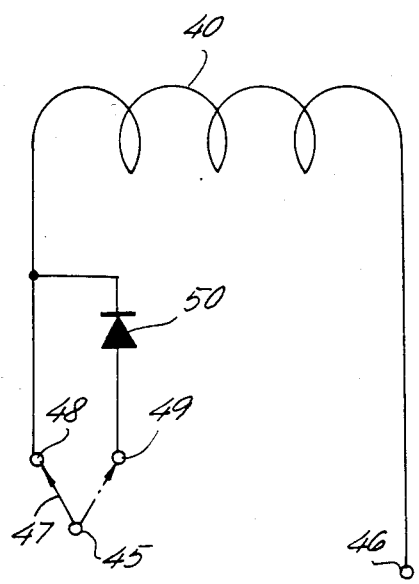
FIG. 4 is a schematic diagram showing one electrical circuit for energizing the solenoid of the pilot valve.

According to the present invention, solenoid coil 40 can be energized by what amount to two distinct power sources, an example of which is shown in FIG. 4. Terminals 45 and 46 are connectable to a source of electric power, such as 120 volt, 60 cycle, alternating current. A movable switch member 47 may be brought alternatively into engagement with either of two terminals 48 or 49. Terminal 48 is connected in series with solenoid coil 40 and terminal 46. Thus, when switch member 47 is in its solid line position engaging terminal 48, full wave current is applied to coil 40, and armature 34 moves into a stable condition engaging stationary armature 42. Terminal 49 is connected in series with a diode 50, coil 40, and terminal 46. Thus, when switch member 47 is shifted to its broken line position engaging terminal 49, half wave rectified current is applied to coil 40. This causes armature 34 to oscillate toward and away from valve seat 31, the range of vibratory movement being indicated by the distance 51 in FIG. 3.

Operation of the valve will now be explained. Assume that solenoid coil 40 is deenergized, i.e., terminals 45 and 46 are disconnected from a source of power, and the valve is in the condition shown in FIG. 1. Fluid at inlet pressure, from inlet port 11, fills chamber 23 through bleed hole 24, this fluid also filling chamber 37 through port 27. The force on the upper face of diaphragm 18 produced by this fluid pressure, together with the force of spring 21, hold main valve member 20 against seat 14 to close the main valve. Spring 36 holds pilot valve member 35 against seat 31 to close the pilot valve.

If terminals 45 and 46 are now connected to a source of AC power, by means of a switch (not shown), and switch member 47 contacts terminal 48, full wave power is applied to solenoid coil 40. As a result, armature 34 rises to the position shown in FIG. 2, opening the pilot valve. Pressurized fluid within pilot chamber 37 flows through pilot outlet port 28 to main outlet port 12. Pressurized fluid in chamber 23 flows through pilot inlet port 27 into chamber 37, and then through port 28 to main outlet port 12. As a result, the pressure above diaphragm 18 is relieved, and inlet pressure acting on the lower face of the diaphragm and valve member 20 in the area surrounding valve seat 14 cause the diaphragm and valve member to rise to the position shown in FIG. 2, thereby opening the main valve.

Although high pressure fluid continues to enter chamber 23 through bleed hole 24, pressure does not build up in the chamber since the cross-sectional flow areas of pilot ports 27 and 28, and pilot orifice 30 are larger than the cross-sectional flow area of bleed hole 24. Thus, as long as the pilot valve remains in its stable open condition (FIG. 2), the main valve remains open, and liquid flows through the valve at a rapid rate.

When the volume of liquid dispensed nears the quantity desired, switch member 47 is automatically shifted from terminal 48 to terminal 49. As a result, solenoid coil 40 is no longer energized with full wave AC power, but instead with half wave rectified AC power, since diode 50 prevents every alternate half wave of current from reaching coil 40. Half wave power is not sufficient to hold armature 34 in the stable condition shown in FIG. 2. Instead, the half wave current causes the armature to oscillate toward and away from valve seat 31, as illustrated in FIG. 3. Oscillation of pilot valve member 35, carried by armature 34, in the region adjacent to valve seat 31 permits some liquid flow from chamber 37 through orifice 30 to outlet port 12. However, the rate of this flow is smaller than when the pilot valve is fully open (FIG. 2). In fact, the flow rate through orifice 30 when valve member 35 oscillates is smaller than or about equal to the flow rate of inlet liquid through bleed hole 24 into chamber 23. Consequently, fluid pressure builds up in chamber 23 which, together with the force of spring 21 moves, valve member 20 into engagement with valve seat 14 to close the main valve, and discontinue high rate flow through the valve. Liquid flow continues through the valve, at a low rate, from main inlet port 11, through bleed hole 24, chamber 23, pilot inlet port 27, pilot chamber 37, and pilot outlet port 28 to main outlet port 12. This low rate flow continues until the prescribed quantity of liquid has been dispensed, at which point power to terminals 45 and 46 is automatically switched off. Solenoid coil 40 is then completely deenergized, and the pilot valve closes (FIG. 1).

Figure 5:
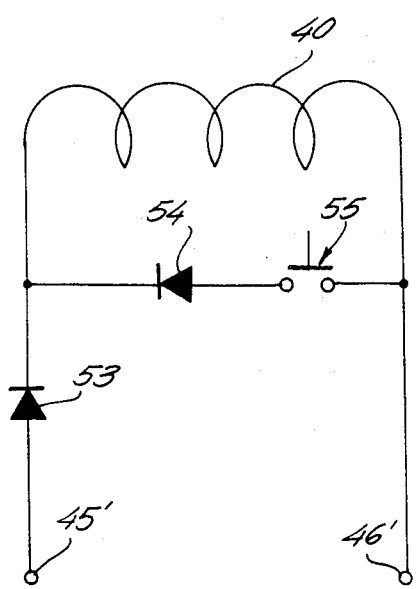
FIG. 5 is a schematic diagram showing an alternative circuit for energizing the solenoid of the pilot valve.

An alternative circuit for energizing solenoid coil 40 is shown in FIG. 5. Terminals 45' and 46', like terminals 45 and 46 of FIG. 4, are connectable to a source of conventional AC power. Terminal 45' is connected in series with a diode 53, coil 40, and terminal 46'. Connected in parallel with coil 40 are series-connected diode 54 and switch 55. When power is applied to terminals 45' and 46', and switch 55 is closed, half wave power is applied to coil 40; however, current flow through coil 40 is continuous by virtue of the stored energy in coil 40 flowing through diode 54, and the valve is fully open (FIG. 2) delivering high rate flow. Opening of switch 55 causes half wave power to be applied to coil 40, whereby armature 34 oscillates (FIG. 3), and low rate flow passes through the valve.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

We claim:

1. A pilot-operated dual flow rate valve, comprising:
   (a) a main valve component having a main orifice, the main valve component having an open position, in which fluid flows through the orifice at a relatively high rate, and a closed position in which there is no fluid flow through the orifice.
   (b) a pilot valve component for controlling the main valve component, the pilot valve component having a pilot valve orifice surrounded by a valve seat, and a pilot valve member movable into and out of engagement with the pilot valve seat to close and open the pilot valve, respectfully, the pilot valve component having an open position in which fluid flows through the pilot valve component and in response thereto the main valve component opens, the total fluid flow leaving the valve being a combination of flow through the orifice of the main valve component and flow through the pilot valve component, and
   (c) means for decreasing the rate of fluid flow through the pilot valve component, while the main valve component is open, to a rate at which the main valve component closes, without terminating fluid flow through the pilot valve component, so that the total fluid flow leaving the valve is only the fluid flowing through the pilot valve component, this latter flow being at a relatively low rate, said flow-rate-decreasing means including controlling means for oscillating the pilot valve member in a direction toward and away from the pilot valve seat.

2. A valve as defined in claim 1 wherein the pilot valve member controlling means is electrically energized.

3. A valve as defined in claim 2 wherein the pilot valve member controlling means includes two distinct electrical power sources, one of which causes the pilot valve member to assume a stable condition in which the pilot valve is open, and the other of which causes the pilot valve member to oscillate.

4. A valve as defined in claim 2 wherein the pilot valve member controlling means includes an electrical solenoid, an armature movable in response to energization and deenergization of the solenoid, and means for energizing the solenoid to cause the armature to alternatively oscillate or maintain a stable position in which the pilot valve is open.

5. A valve as defined in claim 4 wherein the pilot valve member is carried by the armature.

6. A valve as defined in claim 4 wherein the means for energizing the solenoid includes means for alternatively applying half wave or full wave alternating current to the solenoid.

* * * * *